United States Patent

[11] 3,616,232

[72] Inventors Richard G. Anderson
Ferguson;
Leonard Keay, Florissant, both of Mo.

[21] Appl. No. 752,458
[22] Filed Aug. 14, 1968
[45] Patented Oct. 26, 1971
[73] Assignee Monsanto Company
St. Louis, Mo.

[54] PURIFICATION AND FRACTIONATION OF ENZYME MIXTURE FROM AQUEOUS SOLUTION
16 Claims, No Drawings

[52] U.S. Cl. .......... 195/66 R
[51] Int. Cl. .......... C07g 7/028
[50] Field of Search .......... 195/66

[56] References Cited

UNITED STATES PATENTS

| | | | |
|---|---|---|---|
| 3,031,380 | 4/1962 | Minagawa et al. .......... | 195/66 |
| 3,272,717 | 9/1966 | Fukumoto et al. .......... | 195/66 X |

OTHER REFERENCES

Askonas, Biochemical Journal, Vol. 48, pg. 42–48 (1951).

*Primary Examiner*—Lionel M. Shapiro
*Attorneys*—Gordon W. Hueschen, Hueschen and Kurlandsky and John D. Upham

ABSTRACT: Water-clear enzyme solution containing enzyme, e.g., protease and/or amylase, for example, a clarified beer from *B. subtilis* micro-organism production of enzymes or redissolved and clarified enzyme mixture, is treated with solvent to remove polysaccharides and undesirable colored materials. Amylase fraction when present can be separated from protease fraction and both fractions recovered with facility by employment of water-miscible solvent, in which enzymes are not soluble, solvent being used in particular proportion of volume to volume of starting enzyme-containing solution, depending on separation or fractionation desired, and preferably with slow addition of cold solvent to cold solution with vigorous agitation of solution during addition. Allows precipitation of amylase and/or precipitation of protease, or precipitation of both with fractionation thereof into amylase-rich and protease-rich fractions, and even fractionation of proteases, with polysaccharide fraction and colored material remaining in supernatant. High recoveries and purity are attained.

PURIFICATION AND FRACTIONATION OF ENZYME MIXTURE FROM AQUEOUS SOLUTION

BACKGROUND OF INVENTION

1. Field of Invention

Enzymes; fractionation and purification of enzyme mixture.

2. Prior Art

Production of enzyme mixtures by Bacillus subtilis microorganisms is known. When such enzyme mixtures contain amylase and polysaccharides in addition to proteases, separation and purification is difficult. Highly pigmented materials from the fermentation are attracted to the polysaccharide fraction, and this polysaccharide fraction and amylase are difficulty separated from the desired proteases. Commercial enzyme mixture products produced and sold according to U.S Pat. No. 3,031,380 contain up to about 30 percent polysaccharides and are undesirably highly colored. The prior art, as represented by the cited patent, has employed an aqueous beer filtrate for isolation, with salting out of these enzymes by $(NH_4)_2SO_4$ (ammonium sulfate), filtration, discard of the filtrate, redissolution of the filtration residue in water, reconversion to an $(NH_4)_2SO_4$ solution, raising the pH with ammonium hydroxide to precipitate amylase, filtration removal of amylase, and finally addition of further $(NH_4)_2SO_4$ to precipitate protease by downward adjustment of pH and isolation of the same. The individual enzymes then require further purification by dissolution in water, ion-exchanging an alcohol precipitation. It is apparent that this is not a simple procedure and its effectiveness leaves much to be desired.

It would therefore be highly desirable to provide a simplified and improved process whereby a water-clear beer from the fermentation production of the enzyme mixture, or from redissolution of the enzyme mixture after precipitation with excess solvent, could be readily purified of polysaccharide and undesirable coloring materials and whereby amylase could be more readily and completely removed, and if desired isolated, from the proteases also present in the solution, e.g., beer filtrate or solution of redissolved enzyme mixture solids, and whereby proteases could also be readily separated and, if desired, also fractionated in the process.

It is well known that various enzymes have various different activities or capacities. For example, amylase is active in starch digestion. Protease, on the other hand, is effective in the digestion of protein material by hydrolysis or bond-splitting activity, neutral protease being active at substantially neutral pH's whereas alkaline protease is active at more alkaline pH's. When in combination, the various enzymes are frequently subject to autodigestion or endogenous deterioration. For this reason, and also because it is highly desirable to have specific enzymes available for use in various specific applications, the desirability of having the individual enzymes, as well as efficient methods for the separation of enzyme mixtures into their individual components, is readily apparent.

SUMMARY OF THE INVENTION

The present invention involves treatment of a water-clear solution containing enzyme, e.g., amylase, protease, or mixtures thereof, for example, a beer filtrate or aqueous solution of redissolved enzyme solids with a selected solvent, thereby to selectively precipitate the enzyme, e.g.; amylase or protease, or both, individually or together, as may be desired, depending upon the volume of solvent employed, with substantial freedom from the sticky, gummy polysaccharides and undesired coloring matter which remain in the supernatant. The process permits removal of polysaccharides and color bodies from enzymes and separation and fractionation of protease and amylase, if desired, with facility and is a striking and unpredictable advancement in the art.

It was previously not recognized or believed that it was possible to directly purify such aqueous enzyme mixture, or that, in such a direct process, additional solvent over that necessary to precipitate the enzymes would not precipitate additional enzyme, but only additional impurities. It has now been found, unpredictably, that by varying the solvent volume proportion to the volume of liquid enzyme-containing starting material, and by adhering to certain other critical parameters, it is not possible to separate purified enzymes, and fractionate protease and amylase, when present, but also fractionate neutral and alkaline protease and eliminate undesired polysaccharides and impurities.

OBJECTS

The provision of a process having any or all of the above-enumerated advantages is an object of the invention, Additional objects will become apparent hereinafter, and still others will be obvious to one skilled in the art.

GENERAL DESCRIPTION OF THE INVENTION

The starting material for the process of the present invention is a water-clear fermentation beer, as obtained by filtration of centrifugation, or an aqueous extract of the enzyme or enzyme mixture. The latter is obtainable by redissolving a crude solid precipitated enzyme mixture, as may be obtained by precipitation of the enzyme-containing mixture of solids from a clarified fermentation beer using an excess of water-miscible organic solvent in which the enzyme mixture is insoluble, with further clarification if necessary. Hereinafter the starting material will be referred to as the "solution." In either case, the starting material should be a water-clear fluid, which will ordinarily not contain solids visible to the naked eye, hence the designation water-clear. Additional processing may be effected upon this solution to remove other enzyme materials and undesired impurities, if desired. The invention can also be applied to any other water-clear aqueous solution an enzyme, e.g., amylase, protease or protease and amylase, together with polysaccharides and undesirable coloring materials, whether of natural or synthetic origin.

The solvent employed is selected from water-miscible organic solvents in which the enzyme is not soluble, preferably polar solvents selected from the group consisting of lower-alkanols, e.g., methanol, ethanol, isopropanol, lower-alkyl ketones, e.g., methyl ethyl ketone, acetone, and cyclic ethers, e.g., tetrahydrofuran and dioxane. Isopropyl alcohol and acetone are preferred solvents.

The volume of solvent employed according to the invention should preferably be no more than that necessary to precipitate the enzymes, as further addition of solvent has been found to precipitate only pigment, gummy polysaccharides, and other undesirable impurities. It has thus been determined that employment of up to about 0.8 volume, preferably 0.2 to about 0.8 volume of solvent, for each volume of starting water-clear enzyme-containing solution, results in precipitation of an amylase-rich fraction, employment of 0.8 to 1.1 volumes results in precipitation of a neutral protease-rich fraction, and employment of about 1.1 to 1.4 volumes of solvent per volume of starting water-clear enzyme-containing solution results in precipitation of an alkaline protease-rich fraction. Beyond this amount of solvent, the precipitate predominantly comprises polysaccharides, pigments, and other undesirable impurities.

The volume of solvent is therefore critical; 0.2–0.8 volume of solvent per 1 volume of aqueous solution, e.g., beer filtrate, brings down amylase and 0.8–1.4 volumes of solvent, per volume of solution, brings down protease. The use of up to 0.8 volume unpredictably results in direct precipitation of the amylase, which may be recovered by usual physical procedure, such as filtration or centrifugation. The remaining solution contains protease, polysaccharides, and impurities. Additional solvent brings down the protease as disclosed, again unpredictably. If it is desired to fractionate neutral and alkaline proteases, a volume of about 0.8 to 1.1 brings down neutral protease, and about 1.1–1.4 results in precipitation of alkaline protease. Any or all of these enzymes or enzyme rich fractions may be recovered by usual physical procedures. Still unpredictably, the polysaccharides and undesired highly pigmented materials remain in the supernatant liquid and may be discarded. If desired, the amylase (when present) and protease may be precipitated together by going to about 1.4 volumes of solvent, and obviously the proteases can be precipitated together at 0.8–1.4 volumes after separation of amylase.

In this manner, polysaccharides and other gummy, highly pigmented materials can be 99 percent eliminated from the isolated enzyme product. Although the procedure may be repeated upon the supernatant if desired, 91 percent of the total protease activity has been recovered in a single processing, involving slow addition of cold isopropyl alcohol up to a 1.4 to 1 volume proportion with addition over a 1 hour period, stirring for an additional 30 minutes, and standing for an additional hour. The desired protease fraction (both alkaline and neutral proteases) had a very high activity (2,120,000 protease units/gram in a pH 7.0 casein assay) and a very low polysaccharide content (less than 8 percent as compared to about 27.9 in the commercial product). Such an efficient procedure leaves little to be gained by recycling of the supernatant (filtrate), but reapplication of the process to the supernatant either separately, in combined form, or upon recycling with a fresh filtrate, of course has the desirable effect of increasing the efficiency of the process still further.

As already stated, it has been found that, not only can precipitation of the enzymes present in the water-clear solution be obtained by employment of particular proportions of solvent volume to volume of starting enzyme-containing solution, but also that fractionation of the various enzyme components and isolation of enzyme-rich fractions may be advantageously obtained according to the method of the invention. This is accomplished by observance not only of the particular proportions of solvent volume to volume of starting water-clear enzyme-containing solution, the amount of solvent employed depending upon the particular composition desired in the precipitated fraction, but also the careful observance of certain conditions in carrying out the separation and fractionation.

For example, for best results, addition of water-miscible organic solvent (in which the enzymes are insoluble but which does not inactivate or denature the enzymes) to the clarified beer should be a slow addition, preferably a dropwise addition. Moreover, the organic solvent should preferably be cold. In addition, the starting enzyme-containing solution should also preferably be cold. Further, addition of the organic solvent to the enzyme-containing solution should be made with vigorous stirring or other agitation of the water-clear enzyme-containing solution. Thus, carrying out the separation and fractionation under the most advantageous conditions, the addition of the solvent to the enzyme-containing solution will be slow, preferably dropwise, both the solvent and the starting solution will be cold, and vigorous agitation will be employed during the solvent addition.

Although cooling to any temperature below room temperature has been found advantageous, it is desirable that, for best results, both the solvent and the starting enzyme-containing solution be chilled to 10° C. or below, and about 5° C. has been found an extremely useful, attainable, and operative temperature for carrying out the method of the invention.

The pH of the starting enzyme-containing solution will usually be between about 5.5 and 7, preferably 6 to 6.5, and this is a readily obtainable if not normal pH range for the starting enzyme-containing solution.

If the beer and solvent are not cooled, as previously described, less satisfactory separations and lower yields of desired enzyme-rich fractions are obtained.

If addition of the solvent is not made slowly, preferably very slowly, to the solution which is well-stirred or otherwise agitated, the product is characterized by lower specific activity (activity per gram), increased amounts of pigment, increased overall weights, and, in fractionations, the separation of components is not as satisfactory.

The exact activity of the enzymes employed as starting material depends on the method of preparation and is not critical to the present invention providing only that the starting solution has the desired plural enzymatic activity. Various analytical methods are available to determine the activity of enzymatically active material, for example, the protease activity of proteolytic enzymes can be determined by well-known Casein-digestion methods. According to such tests, a protease catalyzes the hydrolysis of casein for a certain period of time and temperature and at a certain pH; the reaction is stopped by the addition of trichloroacetic acid, and the solution is filtered. The color of the filtrate is developed by a Folin phenol reagent, and the level of enzyme activity is measured spectrophotometrically in units of casein tyrosine. This method is more fully described in the Journal of General Physiology 30, 291 (1947) and in Methods of Enzymology 2, 33 by Academic Press N.Y. (1955). Amylase activity is generally determined by the well-known dinitrosalicyclic acid method of Bernfeld.

A particularly effective source of mixed enzymes which are used as starting material in the present invention is a mutated *Bacillus subtilis* organism. The process for producing this organism and enzymes therefrom is described in U.S. Pat. No. 3,031,380. A culture of this *Bacillus subtilis* (strain AM) organism has been deposited with the U.S. Department of Agriculture, Agricultural Research Service, Northern Utilization Research and Development Division, 1815 North University Street, Peoria, Ill., 61604, and has been assigned No. NRRL B-3411. The enzymatically active material produced by this organism has been found generally to consist of two proteases, approximately 65–75 percent neutral protease (activity at a pH of 7.0–7.5 ) and about 25–35 percent alkaline protease (activity at a pH of 9–10 ). A significant amount of amylase is also present. There are generally about 700 thousand to about 1.2 million units of neutral protease activity per gram and about 250 thousand to about 400 thousand units of alkaline protease activity per gram of isolated solids as determined by Anson's variation of the Kunitz-Casein method. There are generally about 300 thousand to 350 thousand units of amylase activity per gram as determined by the Bernfeld method. As pointed out in the cited patent, the relative proportions of protease to amylase will vary depending on the exact conditions of growth of the micro-organism but we have found that the neutral and alkaline protease and the amylase will be produced, in at least some amounts, almost regardless of changes in the culture medium and other conditions of growth of the micro-organism.

Another source of enzymes which can be used as starting material in accord with the present invention is *B. subtilis* strain NRRL 644, *B. subtilis* strain NRRL 941, and *B. subtilis* strain IAM 1523 (Japanese Culture Collection.) Still other *B. subtilis* and additional micro organisms are available which produce protease or a mixture of proteases or protease and amylase, at least to a limited if not optimum extent.

DESCRIPTION OF THE PREFERRED EMBODIMENTS

The following examples are given by way of illustration only, and are not to be construed as limiting.

General Outline of Preparation of Fermentation Beer

A culture of *Bacillus subtilis* AM is inoculated into a sterile slurry of grains and other nutrient material (such as rice bran, corn meal, fish meal, wheat bran, Enzose [TM—about 50–80 percent dextrose and the balance higher saccharides, being the dried mother liquor remaining from dextrose manufacture by enzymatic hydrolysis of corn starch] distillers solubles, corn steep liquor, etc.) containing protein, carbohydrate, minerals, and growth factors. The vessel is agitated and aerated by bubbling sterile air through the inoculated slurry. The pH may be controlled or left to achieve its own natural pH. Aliquots of the beer are removed for assay at various times and, when enzyme production is apparently a maximum, the fermentation beer is then centrifuged and/or filtered prior to enzyme isolation.

Some details and examples of this type of enzyme production method are given generally in U.S. Pat. Nos. 2,530,210 of C. V. Smythe, B. B. Drake and C. E. Neubeck (to Rohm & Haas Co., Nov. 14, 1950, and 2,549,465 of J. C. Hoogerheide and E.G. Laughery (to Pabst Brewing Co., Apr. 17, 1951, and particularly in U.S. Pat. No. 3,031,380 of Apr. 24, 1962.

The foregoing procedure, especially that of U.S. Pat. No. 3,031,380, is productive of a fermentation beer containing the desired enzyme mixture. For clarification purposes to give a water-clear beer for use as starting material, this fermentation beer may merely be centrifuged and/or filtered. Alternatively, the solid enzyme mixture may be precipitated by adding an excess of solvent, e.g., isopropanol or acetone, to the fermentation beer either without prior filtration or centrifugation or after a prior centrifugation and/or filtration, which is productive of a solid precipitate comprising an enzyme mixture, which may then be readily redissolved in water to give a water-clear enzyme solution which may be used as starting material in the process of the invention. Obviously, the starting solution, by whichever procedure procured, may be subjected to addition centrifugation and/or filtration if desired to upgrade the quality of the starting enzyme solution.

EXAMPLE 1

The crude extract containing the enzymes was filtered through cheesecloth to remove coarse particles. The liquid was then clarified by passage through the Sharples Super centrifuge. One liter of clarified extract was placed in a 4 liter beaker and cooled to 5° C. 1,750 ml. cold (5°) acetone (1.75 volumes/volume extract) was added slowly dropwise with vigorous stirring. The solid was then allowed to settle and the supernatant removed as much as possible by decantation. The solid was then washed twice with 1 liter aliquots of a 3 to 1 acetone/water mixture by decantation and then twice with 1 liter portions of acetone. The slurry was then filtered through a Whatman No. 1 paper on a large Buchner funnel under vacuum and the solid washed with acetone as the surface became dry. The solid was sucked dry under vacuum and then powdered and air dried. Similarly 1 liter portions of the extract were precipitated with 2,000 ml.; 2,250 ml.; 2,500 ml.; 2,750 ml. and 3,000 ml. acetone (i.e., 2.00, 2.25, 2.50, 2.75 and 3.00 volumes acetone per volume extract) and the washings, etc. carried out as above. The weight of product isolated increased as the volume solvent/volume extract increased (table I) but the specific activity (protease-caseinolytic activity pH 7.0) decreased and the overall recovery of the enzyme was constant.

TABLE I.—ACETONE PRECIPITATION OF ENZYMES FROM EXTRACT

| Volume acetone per vol. extract | Weight product, gm. | Protease, u./g. | Total protease |
|---|---|---|---|
| 1.75 | 8.65 | $1.26\times10^6$ | $10.89\times10^6$ |
| 2.00 | 9.65 | $9.40\times10^5$ | $9.07\times10^6$ |
| 2.25 | 11.05 | $9.30\times10^5$ | $10.27\times10^6$ |
| 2.50 | 12.20 | $8.85\times10^5$ | $10.79\times10^6$ |
| 2.75 | 13.85 | $9.25\times10^5$ | $12.81\times10^6$ |
| 3.00 | 15.60 | $7.35\times10^5$ | $11.46\times10^6$ |

(Casein digestion units, Anson procedure, are used throughout for protease determinations; dinitrosalicylic acid procedure of Bernfeld for amylase units.) As shown by table I, the weight of product increases as the volume of solvent increases, but the specific activity is not increased and in fact diminishes as solvent is increased beyond that required for precipitation of the enzymatically active fractions. The total protease precipitated is approximately the same, over the range of solvent volumes employed, but specific activity in units per gram decreases because of additional impurities brought down by the excess solvent.

EXAMPLE 2

A crude enzyme extract was clarified by filtration through cheesecloth followed by centrifugation through a Sharples Super centrifuge. 1,000 ml. extract was placed in a 4 liter beaker, cooled to 5° and cold (5°) acetone added (1,500 ml., 1.5 volumes per volume extract) dropwise with vigorous agitation. The supernatant was removed by decantation after being allowed to settle, the precipitate was restirred in 1 liter acetone/water (3:1) and again the supernatant remove by decantation. The precipitate was then collected by filtration on a Whatman No. 1 paper on a Buchner funnel under vacuum and the solid washed with anhydrous acetone (1 liter) as it was sucked dry. The precipitate was then powdered and air dried. Similar precipitations were carried out with 1,750; 2,000; 2,250; 2,500 ml. acetone per liter extract (i.e., 1.75, 2.00, 2.25, 2.50 volume/volume extract respectively.)

The weight of solid increased, but the specific activity of both amylase and protease dropped as the volume of solvent used increased (table II.) The total protease and amylase activities recovered were the same irrespective of the volume of solvent.

TABLE II.—ACETONE PRECIPITATION OF ENZYMES FROM EXTRACT

| Vol. acetone/vol. extract | Product, gm. | Protease | | Amylase | |
|---|---|---|---|---|---|
| | | U./g. | Total | U./g. | Total |
| 1.50 | 25.4 | $6.20\times10^5$ | $15.7\times10^6$ | $2.62\times10^5$ | $6.65\times10^6$ |
| 1.75 | 25.6 | $4.91\times10^5$ | $12.6\times10^6$ | $2.26\times10^5$ | $5.80\times10^5$ |
| 2.00 | 27.6 | $5.71\times10^5$ | $15.7\times10^6$ | $2.50\times10^5$ | $6.90\times10^6$ |
| 2.25 | 30.4 | $5.23\times10^5$ | $15.9\times10^6$ | $2.21\times10^5$ | $6.80\times10^6$ |
| 2.50 | 32.5 | $4.85\times10^5$ | $15.8\times10^6$ | $1.94\times10^5$ | $6.30\times10^6$ |

As shown by table II, the same results are apparent here as from example 1, but in this case the comments are applicable to both amylase and protease, the specific activity diminishing in both cases as the amount of solvent employed increases, the total amount of both protease and amylase activity remaining approximately the same.

EXAMPLE 3

A crude extract containing proteases (neutral and alkaline) and amylase was clarified by filtration through an Enzinger Pressure Leaf Filter at room temperature using Hyflo Supercel (TM—diatomaceous earth) as a filter aid. Clear filtrate (500 ml.) was cooled to 4° C., in a beaker and agitated with a magnetic stirring bar. Anhydrous isopropanol (cooled to 4° C.) was added slowly in 100 ml. (0.2 volume) portions over a 15 minute period from a separatory funnel placed so that the alcohol ran down the side of the beaker. Stirring was continued for 30 minutes and the precipitate was collected by centrifugation. The precipitate was dissolved in 0.01 percent calcium acetate solution and immediately lyophilized. The supernatant was returned to the beaker and the precipitation cycle repeated with a further 0.2 volume of solvent. This cycle was repeated until the cumulative addition of solvent was 3.2 volumes of the beer. The precipitates which were obtained in the earlier stages of the precipitation (up to about 1.0 volume per volume of extract) were lighter colored, and when lyophilized gave off-white powders. The later fractions (above 1.4 volumes solvent) were gummy oils which gave tan colored powders when lyophilized.

The results (table III) show that the enzymes are obtained with high protein contents and low polysaccharide contents in the earlier stages of fractionation. There is some indication that the amylase precipitates before the neutral protease (protease assay pH 7.0) and the alkaline protease (protease assay pH 10.0 ) precipitates after the neutral protease.

TABLE III.—STEPWISE FRACTIONATION OF ENZYMES FROM A FERMENTATION BEER BY ISOPROPANOL

| Cumulative solvent addition (vol.) | Fraction weight [1] | Protease (pH 7.0) activity/gram×10⁶ | Percent protease (pH 7.0) recovery | Protease (pH 10.0) acitivity gram×10⁶ | Percent protease recovery (pH 10.0) | Amylase activity/gram×10⁶ | Percent amylase recovery | Percent reducing sugar | Percent polysaccharide | Percent polysaccharide recovery | Percent protein (Kjeldahl) | Protein (Lowry)[2] | Percent nitrogen |
|---|---|---|---|---|---|---|---|---|---|---|---|---|---|
| .2 | 2.50 | .340 | 2.5 | .132 | 3.9 | .320 | 8.5 | | <8 | <0.9 | 25.5 | 7.3 | 4.08 |
| .4 | 2.52 | .565 | 4.4 | .135 | 4.2 | 1.120 | 29.8 | | <8 | <0.9 | 25.0 | 5.0 | 4.01 |
| .6 | 1.33 | 1.425 | 5.8 | .532 | 1.8 | 1.700 | 23.8 | | <8 | <0.5 | 29.2 | 9.0 | 4.68 |
| .8 | 2.83 | 3.900 | 34.2 | .475 | 15.8 | 1.940 | 58.4 | | <8 | <1.1 | 45.0 | 18.2 | 7.20 |
| 1.0 | 1.30 | 6.200 | 25.0 | 1.118 | 17.1 | .850 | 11.6 | | <8 | <0.5 | 57.7 | 14.2 | 9.24 |
| 1.2 | 1.05 | 5.800 | 18.7 | 1.360 | 16.9 | .009 | <0.1 | None | 10.3 | 0.5 | 38.6 | 12.7 | 6.18 |
| 1.4 | .01 | 1.350 | <.01 | 1.800 | <.01 | .001 | <0.1 | | | | | 10.0 | |
| 1.6 | .05 | .137 | <.01 | .230 | <.01 | None | None | | | | | 7.2 | |
| 1.8 | .25 | .001 | <.01 | None | None | None | None | | | | | 7.3 | |
| 2.0 | 2.44 | .001 | <.01 | None | None | None | None | Trace | 41.7 | 4.99 | 21.0 | 6.9 | 3.37 |
| 2.2 | .52 | None | None | None | None | None | None | do | 45.1 | 1.15 | 20.3 | 6.6 | 3.25 |
| 2.4 | 1.30 | None | None | None | None | None | None | do | 43.4 | 2.76 | 23.6 | 5.7 | 3.79 |
| 2.6 | 2.21 | None | None | None | None | None | None | do | 13.1 | 1.42 | 21.1 | 6.6 | 3.39 |
| 2.8 | 2.73 | None | None | None | None | None | None | do | 40.6 | 5.45 | 21.2 | 5.8 | 3.40 |
| 3.0 | 1.29 | None | None | None | None | None | None | do | 44.3 | 2.81 | 20.3 | 5.0 | 3.25 |
| 3.2 | 2.52 | None | None | None | None | None | None | do | 22.1 | 5.21 | 20.3 | 5.0 | 3.25 |
| Totals | | | 90.6 | | 59.7 | | 132.1 | | | | | | |

[1] As percent of starting material.
[2] Aromatic amino acid expressed as percent tyrosine.

As shown by table III, most of the amylase precipitates at a volume of solvent to starting solution proportion between 0 an 0.8, especially between 0.2 and 0.8, whereas neutral protease recovery is greatest at 0.8 to 1.4 and the alkaline protease recovery is greatest between 0.8 and 1.4, but neutral protease recovery in the form of a neutral-protease-enriched fraction is greatest between 0.8 and 1.1 whereas alkaline protease recovery in the form of an alkaline-protease-enriched fraction is greatest between 1.1 and 1.4.

As will be noted from the table, polysaccharides are substantially absent from the precipitate throughout this range, an in fact do not precipitate in any great quantity until the proportion of solvent employed reaches approximately 2.0. Therefore, as will be apparent, recovery of amylase having the highest specific activity can be obtained up to a proportion of solvent of 0.8, a recovery of neutral protease having the highest specific activity can be obtained from about 0.8 to 1.1, and recovery of alkaline protease having the highest specific activity can be obtained from 1.1 to 1.4.

EXAMPLE 4

A crude fermentation extract was clarified by filtration through an Enzinger Pressure Leaf Filter with a Hyflo Super-cel (TM—diatomaceous earth) filter aid. Anhydrous isopropanol (700 ml. 5° C.) was added slowly to a rapidly stirred clear filtrate (500 ml.) over a one hour period. The stirring was continued for a further thirty minutes and the precipitate collected by centrifugation, redissolved in 0.01 percent calcium acetate solution and immediately lyophilized.

The recovery of amylase and neutral protease was very high at this 1.4 to 1 volume, but the recovery of alkaline protease was lower as expected since higher solvent levels are required to precipitate the alkaline protease than the other two enzymes. The product had high enzyme activity (much higher than a lyophilized filtrate) but was low in polysaccharide and pigments. (See table IV)

TABLE IV

Isolation of High Activity Enzyme Mixture from Fermentation Beer

| | |
|---|---|
| Activity/ml.—Filtrate | |
| Protease pH 7.0 | 21,000 |
| Protease pH 10.0 | 8,000 |
| Amylase | 3,800 |
| Activity/gram—Lyophilized Filtrate | |
| Protease ph 7.0 | 320,000 |
| Protease ph 10.0 | 80,000 |
| Amylase | 75,000 |
| % Solids-starting filtrate 3.90% | |

Filtrate
Protease (pH 7.0)—Product
Activity/gram 2,120,000
% Recovery 92.0
Protease (pH 10.0)—Product
Activity/gram 260,000
% Recovery 45.0
Amylase-Product
Activity/gram 475,000
% Recovery 87.0
Solids Recovered
13.8%

* * * * * * * * * * * * * * * * * * * * * * * * * * * * * * *

| Polysaccharide | | Nitrogen | |
|---|---|---|---|
| % in starting material | 30.1 | % in starting material | 3.68 |
| % in product | <8 | % in product | 4.16 |
| % recovery | <0.2 | | |
| Protein | | Ash | |
| % in starting material | 23.0 | % in starting material | 11.2 |
| % in product | 26.0 | % in product | 30.9 |
| % recovery | 15.6 | % recovery | 38.1 |

As will be noted from the foregoing example and table IV, recovery of alkaline protease was relatively low because of the relatively low volume of solvent employed in this process. The figures obtained for the lyophilized products are given for comparison purposes, but as shown by the foregoing, purification and fractionation according to the present process allows much greater specific activity than by lyophilization. Also, the total recovery by the present process is much higher than by lyophilization, the figures on percentage recovery according to the present invention being 92 percent amylase as opposed to 59 percent by lyophilization, approximately 45 percent of neutral protease as opposed to 39 percent by lyophilization, and approximately 87 percent by the present process for alkaline protease as opposed to approximately 77 percent by lyophilization. In addition, as previously stated, the specific activity per gram according to the present process is obviously much greater. Thus, not only is higher specific activity obtained according to the present process, but also a greater total activity is recovered than by lyophilization

EXAMPLE 5

600 ml. cold isopropanol was added dropwise with vigorous stirring to 1 liter clarified fermentation beer and the precipitate removed by centrifugation, resuspended, and lyophilized (–0.6 cut.) A further 200 ml. isopropanol was added to the supernatant and the 0.6–0.8 cut isolated in the same way. 0.8–1.0, 1.0–1.2, and 1.2–1.4 cuts were prepared by successive additions of 200 ml. portions of isopropanol to each preceding supernatant. A 100 ml. sample of the clarified beer was lyophilized to determine the total solid and enzymes in the beer (see table V)

TABLE V

| Fraction | Weight, gm. | Protease, u/g. | Protease, total | Amylase, u./g. | Amylase, total |
|---|---|---|---|---|---|
| Lyophilized beer | 45.75 | 330,000 | 15.09×10⁶ | 91,400 | 4.18×10⁶ |
| 0–0.6 | 3.737 | 540,000 | 2.02×10⁶ | 95,000 | 0.355×10⁶ |
| 0.6–0.8 | 1.182 | 3,630,000 | 4.29×10⁶ | 1,870,000 | 2.21×10⁶ |
| 0.8–1.0 | 0.641 | 2,800,000 | 1.86×10⁶ | 630,000 | 0.404×10⁶ |
| 1.0–1.2 | 0.931 | 2,020,000 | 1.88×10⁶ | 110,000 | 0.102×10⁶ |
| 1.2–1.4 | 0.692 | 820,000 | 0.57×10⁶ | 11,500 | 0.008×10⁶ |

As shown by table V, an amylase-rich fraction is definitely obtained at a 0.6 to 0.8 proportion of solvent volume per volume of solution, and a protease-enriched fraction is clearly obtained at 0.8 to 1.4 proportions.

EXAMPLE 6

2,500 ml. cold isopropanol were run slowly into 5 liters cold clarified fermentation beer with vigorous stirring. The precipitate was collected by centrifugation, resuspended and lyophilized (0–0.5 fraction). A further 1,500 ml. cold isopropanol was added to the supernatant to yield a 0.5 –0.8 fraction and a further portion (0.8–1.1) fraction obtained by addition of 1,200 ml. isopropanol to that supernatant. (see table VI)

TABLE VI

| Fraction | Weight gm. | Protease u./g. | Amylase u./g. |
|---|---|---|---|
| 0–0.5 | 10.24 | 0.365×10⁶ | 1.150×10⁶ |
| 0.5–0.8 | 5.30 | 0.475×10⁶ | 1.150×10⁶ |
| 0.8–1.1 | 8.96 | 6.00×10⁶ | 0.315×10⁶ |

As clearly shown by the foregoing Table VI, an amylase-enriched fraction is clearly obtained between 0 and 0.8 volume of solvent per volume of solution, and a protease-enriched fraction is clearly obtained at 0.8 and higher proportions.

EXAMPLE 7

2 liters clarified fermentation beer was placed in each of 4 4-liter beakers and 1 liter (0.5 vol.) cold isopropanol added slowly to each with vigorous agitation. The precipitates were removed by centrifugation, resuspended in water and lyophilized. Further cuts of 0.5–0.9 vol., 0.8–1.05, 1.05–1.35 volumes isopropanol per volume of beer. The lyophilized portions were pooled, weighted an assayed.

TABLE VII

| Total Fraction | Total Weight | Protease u./g. | Amylase u./g. |
|---|---|---|---|
| 0–0.5 | 24.59 | 486,000 | 1,400,000 |
| 0.5–0.8 | 9.49 | 500,000 | 1,100,000 |
| 0.8–1.05 | 9.24 | 7,390,000 | 470,000 |
| 1.05–1.35 | 6.81 | 2,620,000 | 11,000 |

As clearly shown by the foregoing table VII, the amylase is definitely precipitated at 0 to 0.8 volume of solvent per volume of solution, and the protease is clearly precipitated at 0.8 and higher proportions up to 1.4.

EXAMPLE 8

A clarified fermentation beer from the fermentation of *B. subtilis* var. amylosacchariticus, a known producer of neutral protease, is treated in the manner of example 1.Similar cuts are taken and similar results are obtained.

The same results are obtained using water-clear fermentation beers from the other *B subtilis* strains previously mentioned.

EXAMPLE 9

A clarified fermentation beer from the fermentation production of enzymes employing *B. thermoproteolyticus* var. Rokko, is treated with solvent in the manner of example 1. The same cuts are taken, and substantially the same results are obtained, at least as far as protease precipitation. This precipitation product is a thermolysin or thermoase-enriched fraction, which is separated.

EXAMPLE 10

A synthetic mixture comprising a water-clear solution of amylase, neutral protease, and alkaline protease is prepared and adjusted to a pH of approximately 6. The product is treated in accord with the procedure of example 3. Cuts are taken in a manner identical to those taken in example 3. Fractionation is the solution into its components of amylase, neutral protease, and finally alkaline protease, is readily effected and the various enzyme-enriched fractions are separated from each other by centrifugation. Some polysaccharide remains in the supernatant.

Although best results are obtained by the employment of isopropanol or acetone, as shown by the preceding examples, substantially the same results are obtained employing other lower-alkanols, lower-alkyl ketones, and cyclic ethers, as previously disclosed. It is only necessary that the organic solvent be water-miscible and that the enzyme not be soluble therein or denatured or inactivated thereby. Alkyl groups in lower-alkanols and lower-alkyl ketones employed preferably contain up to and including 4 carbon atoms. Other representative solvents which may be employed include methyl ethyl ketone, dioxane, and tetrahydrofuran. Also, as already mentioned, isopropyl alcohol an acetone are the preferred process solvents.

It is to be understood that the invention is not to be limited to the exact details of operation or exact compounds, compositions, or procedures shown and described, as obvious modifications and equivalents will be apparent to one skilled in the art, and the invention is therefore to be limited only by the full scope of the appended claims, including the application of the doctrine of equivalents thereto.

We claim:

1. Process for purification of a water-clear aqueous solution containing enzyme selected from the group consisting of protease and amylase, polysaccharides and impurities associated therewith, which comprises the step of adding a water-miscible organic solvent which does not dissolve, denature, or inactivate the enzyme, to such a solution with agitation of said solution, said addition being at a slow rate, and adding only sufficient of the solvent to precipitate enzyme without precipitating substantial amounts of polysaccharides or impurities associated therewith.

2. Process of claim 1, wherein amylase is present and enough solvent is added to precipitate substantially only the amylase.

3. Process of claim 2, wherein both amylase and protease are present and sufficient solvent is added so that both amylase and protease are precipitated together.

4. Process of claim 2, wherein both amylase and protease are present and wherein an amylase-rich fraction is recovered and additional solvent then added to precipitate protease.

5. Process of claim 4, wherein both neutral and alkaline protease are present and wherein protease is fractionally precipitated by additionally adding only enough solvent to precipitate a neutral protease-rich fraction, recovering the same, and then adding additional solvent to precipitate an alkaline protease-rich fraction.

6. Process of claim 1, wherein the aqueous solution is a clarified beer from fermentative production of an enzyme mixture by a protease and amylase-producing strain of a *Bacillus* species or an enzyme mixture solution containing solids recovered from such *Bacillus* species fermentation beer and redissolved.

7. Process of claim 6, wherein the enzyme-producing species is a *Bacillus subtilis* strain.

8. Process of claim 1, wherein the solvent is selected from the group consisting of lower-alkanols, lower alkylketones and cyclic ethers.

9. Process of claim 1, wherein the procedure is conducted with the solvent with the solvent and the solution both being cold, preferably at a temperature no greater than about 10° C.

10. Process of claim 4, wherein the solvent is selected from the group consisting of isopropanol and acetone.

11. Process of claim 6, wherein the solvent is selected from the group consisting of isopropanol and acetone.

12. Process of claim 4, wherein amylase is precipitated by addition of solvent in amount up to about 0.8 volume of solvent per volume of enzyme-containing solution.

13. Process of claim 4, wherein protease is precipitated by addition of solvent in amount of about 0.8 to 1.4 volumes of solvent per volume of enzyme-containing solution.

14. Process of claim 5, wherein neutral protease is precipitated at a solvent volume of about 0.8 to 1.1 volumes per volume of starting enzyme-containing solution, and alkaline protease is precipitated at a solvent volume of about 1.1 to 1.4 volumes per volume of enzyme-containing solution.

15. Process of claim 1, wherein cold solvent is added dropwise to a cold, vigorously agitated enzyme-containing solution 16. Process of claim 4, wherein the starting aqueous solution is a clarified beer from fermentative production of an enzyme mixture by a *Bacillus subtilis* strain or an enzyme mixture solution containing solids recovered from the fermentation beer produced by such *Bacillus* strain and redissolved and wherein the enzyme solution is vigorously agitated and amylase precipitated therefrom by addition of solvent in amount of up to about 0.8 volume of solvent per volume of solution and protease is precipitated therefrom by addition of solvent in amount of about 0.8 to 1.4 volumes of solvent per volume of enzyme-containing solution.

* * * * *

UNITED STATES PATENT OFFICE

CERTIFICATE OF CORRECTION

Patent No. 3,616,232 Dated 26 October 1971

Inventor(s) Donald G. Anderson and Leonard Keay

It is certified that error appears in the above-identified patent and that said Letters Patent are hereby corrected as shown below:

| | |
|---|---|
| Col. 1, bridging lines 13-14<br>Page 2, line 10 | "difficulty"<br>-- difficultly -- |
| Col. 1, line 28<br>Page 2, line 23 | "an"<br>-- and -- |
| Col. 2, line 4<br>Page 4, line 9 | "it is not possible"<br>-- it is not only possible -- |
| Col. 2, line 19<br>Page 4, line 21 | "of centrifugation"<br>-- or centrifugation -- |
| Col. 2, line 33<br>Page 5, line 3 | "solution an enzyme"<br>-- solution of an enzyme -- |
| Col. 4, line 19<br>Page 9, line 6 | "dinitrosalicyclic"<br>-- dinitrosalicylic -- |
| Col. 6, line 13<br>Page 13, line 6 | "remove"<br>-- removed -- |
| Col. 7, 5th heading in Table III<br>Page 15, Table III | "acitivity"<br>-- activity -- |
| Col. 7, Table III, final figure in column headed "Percent polysaccharide"<br>Page 15, Table III | "22.1"<br>-- 42.1 -- |
| Col. 8, line 54, Table IV<br>Page 17, Table IV | delete word "Filtrate" (not in application) |
| Col. 8, 3rd line from bottom<br>Page 17, lines 32 and 33 | delete underlining; underlining should appear in 4th line from bottom under "Protein" "Ash" |

M PO-1050 (10-69)

USCOMM-DC 60376-P69
☆ U.S. GOVERNMENT PRINTING OFFICE : 1969 O—366-334

UNITED STATES PATENT OFFICE

CERTIFICATE OF CORRECTION

Patent No. 3,616,232 Dated 26 October 1971

Inventor(s) Richard G. Anderson and Leonard Keay

It is certified that error appears in the above-identified patent and that said Letters Patent are hereby corrected as shown below:

| | |
|---|---|
| Col. 8, lines 49 and 50<br>Page 17, lines 8 and 9<br>(two occurrences) | "ph"<br>-- pH -- |
| Col. 9, line 26<br>Page 18, line 23 | "(-0.6 cut)"<br>-- (0.-0.6 cut) -- |
| Col. 10, line 9<br>Page 20, line 3 | "weighted an"<br>-- weighed and -- |
| Col. 10, line 50<br>Page 21, line 2 | "is the solution"<br>-- of the solution -- |
| Col. 10, line 67<br>Page 21, line 19 | "an"<br>-- and -- |
| Col. 12, line 5, Claim 9<br>Claim 9, line 2 | "with the solvent with the solvent"<br>-- with the solvent -- |

Signed and sealed this 18th day of July 1972.

(SEAL)
Attest:

EDWARD M.FLETCHER,JR.
Attesting Officer

ROBERT GOTTSCHALK
Commissioner of Patents

?M PO-1050 (10-69)

USCOMM-DC 60376-P69
☆ U.S. GOVERNMENT PRINTING OFFICE : 1969 O—366-334